US008549191B2

(12) United States Patent
Mogilnitsky et al.

(10) Patent No.: US 8,549,191 B2
(45) Date of Patent: Oct. 1, 2013

(54) METHOD AND APPARATUS FOR SATA HOT UNPLUG

(75) Inventors: Maxim Mogilnitsky, Beer-Sheva (IL);
Stephen Williams, Manchester (GB);
Andrew Popplewell, Manchester (GB)

(73) Assignee: CSR Technology Inc., Sunnyvale, CA (US)

( * ) Notice: Subject to any disclaimer, the term of this patent is extended or adjusted under 35 U.S.C. 154(b) by 102 days.

(21) Appl. No.: 12/651,924

(22) Filed: Jan. 4, 2010

(65) Prior Publication Data

US 2011/0167178 A1 Jul. 7, 2011

(51) Int. Cl.
*G06F 3/00* (2006.01)
(52) U.S. Cl.
USPC .......................................................... 710/19
(58) Field of Classification Search
USPC .......................................................... 710/19
See application file for complete search history.

(56) References Cited

U.S. PATENT DOCUMENTS

| 5,901,173 | A | * | 5/1999 | Stephens et al. | 375/227 |
| 7,103,130 | B2 | * | 9/2006 | Cao et al. | 375/374 |
| 7,738,502 | B2 | * | 6/2010 | Chang et al. | 370/503 |
| 2004/0120353 | A1 | * | 6/2004 | Kim et al. | 370/503 |

OTHER PUBLICATIONS

Serial ATA Revision 3.0 Specification, Jun. 2009, available from https://www.sata-io.org/developers/purchase_spec.asp.
Serial Attached SCSI Revision 1.1 Specification, ANSI INCITS 417-2006, available from http://webstore.ansi.org/RecordDetail.aspx?sku=ANSI%20INCITS%/020417-2006.
Universal Serial Bus Revision 3.0 Specification, downloaded from http://www.usb.org/developers/docs/.

* cited by examiner

*Primary Examiner* — Chun-Kuan Lee
(74) *Attorney, Agent, or Firm* — Pillsbury Winthrop Shaw Pittman LLP

(57) ABSTRACT

A method and apparatus are provided for serial advanced technology attachment (SATA) hot unplug. In one embodiment, a method includes detecting a connection of a SATA storage device to a SATA host interface by monitoring physical (PHY) layer signals derived from SATA communication terminals, by a controller of the host interface. The detection being based on phase locked loop (PLL) response of the PHY layer signals. The method further includes detecting disconnection of the SATA device based on the PLL response and outputting a notification, by the controller, when the PLL response indicates that the SATA device has been disconnected.

18 Claims, 3 Drawing Sheets

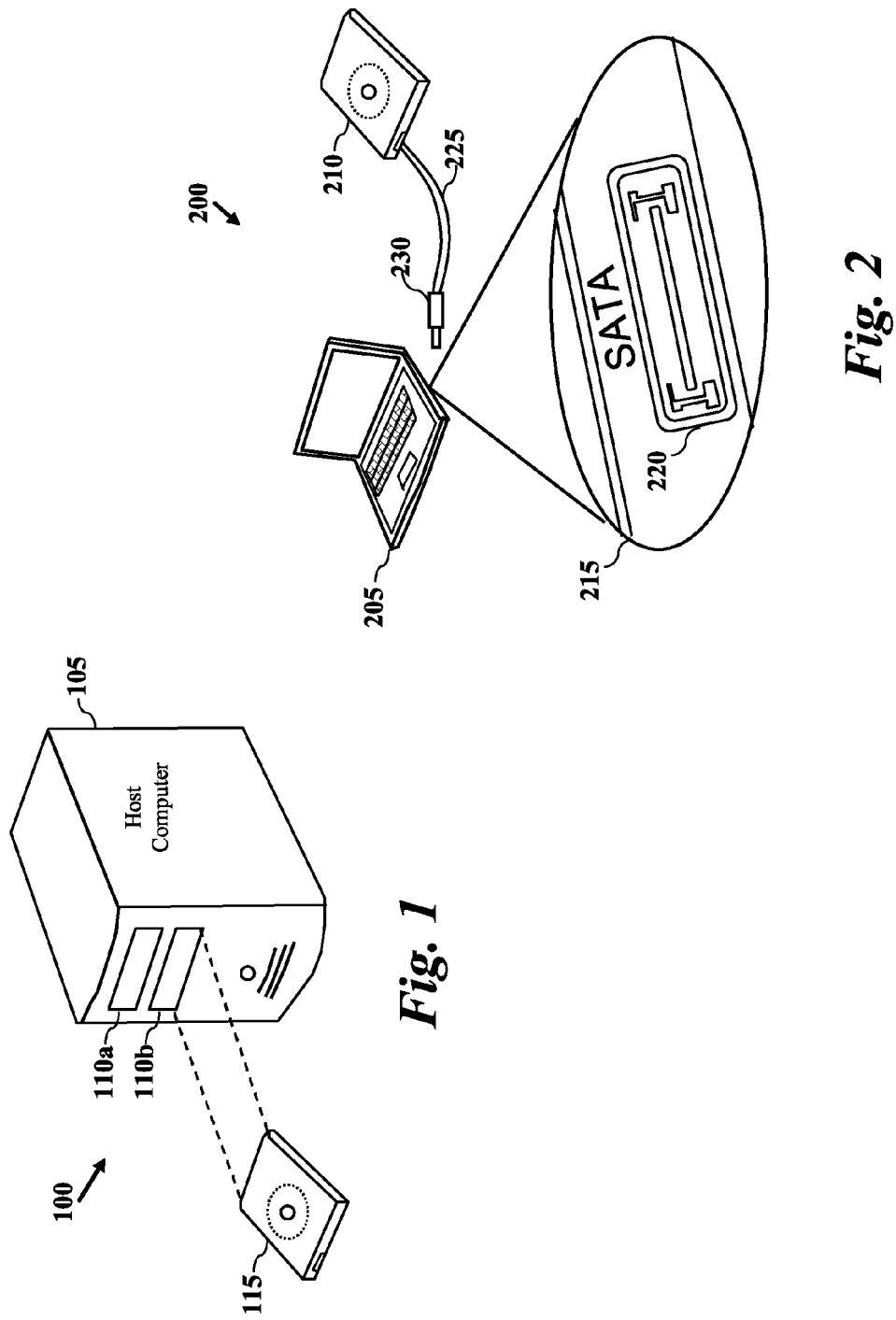

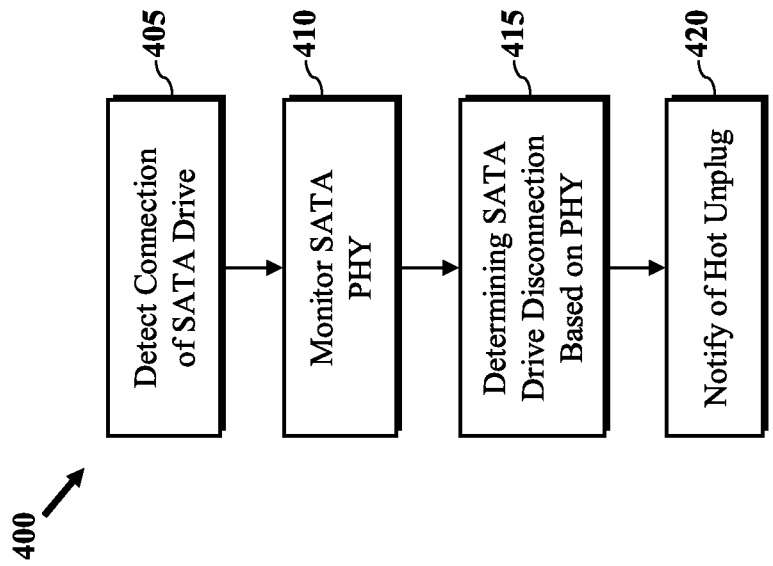
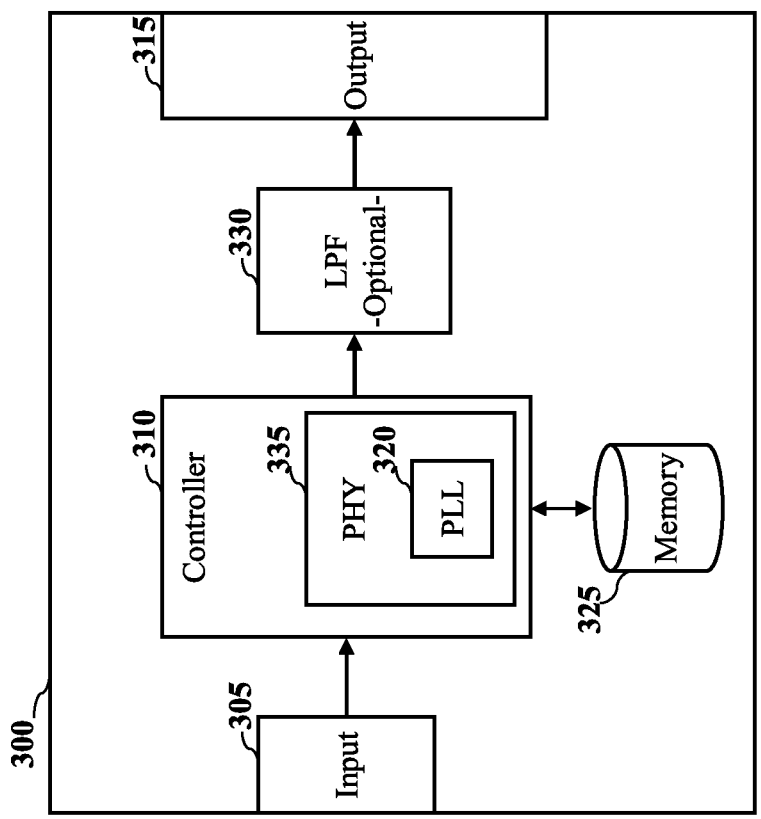

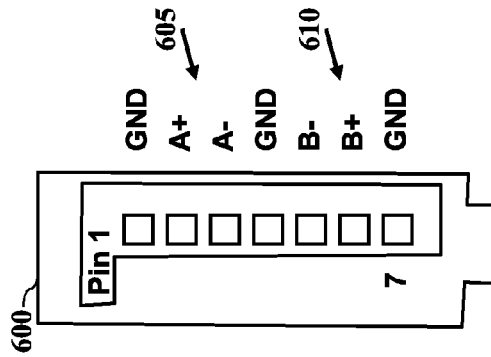
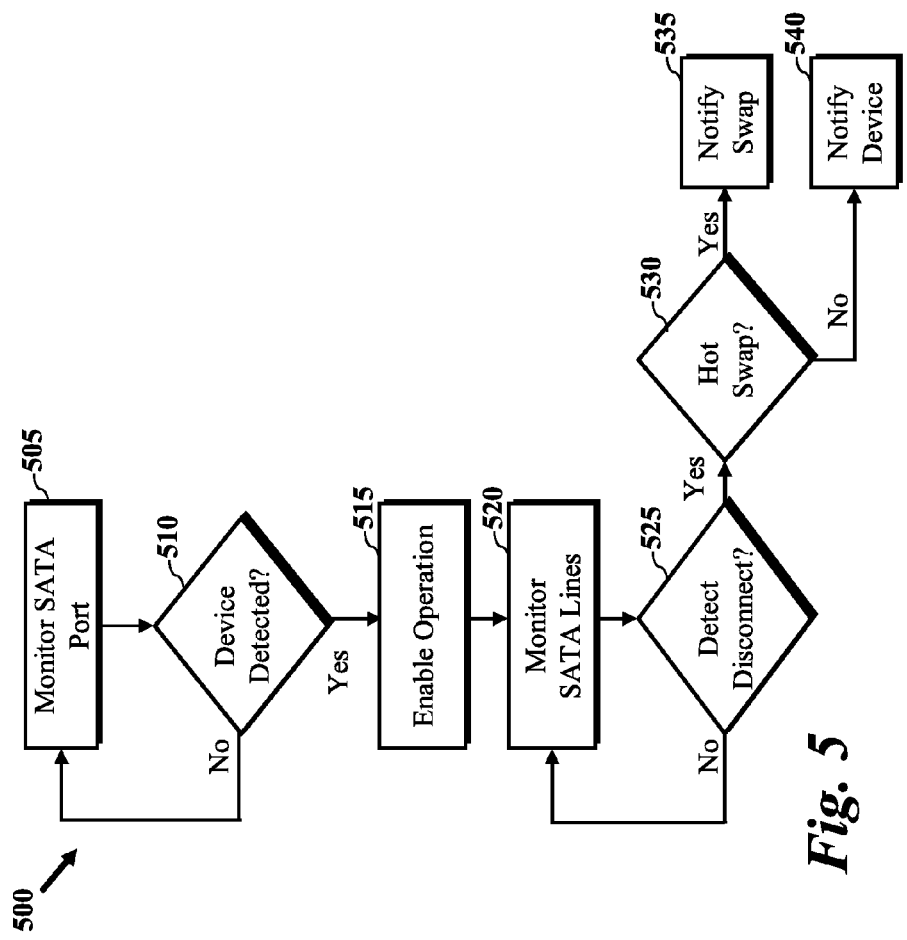

METHOD AND APPARATUS FOR SATA HOT UNPLUG

FIELD OF THE INVENTION

The present invention relates in general to storage devices and more particularly to providing hot unplug of SATA devices.

BACKGROUND OF THE INVENTION

Serial advanced technology attachment (Serial ATA, or SATA), is a communication interface. Currently, SATA is primarily used for coupling mass storage devices, such as hard disk drives, optical drives, etc. to host bus adapters. Many modern computing devices include SATA host adapters for interfacing with SATA storage devices as SATA storage interfaces provide faster and more efficient data transfer in comparison to conventional interfaces, such as Parallel ATA (PATA) or External Integrated Drive Electronics (EIDE).

The first generation of SATA interfaces, SATA 1.5 Gb/s, as developed by the Serial ATA International Organization (SATA-IO) provide for communication at a rate of 1.5 GB/s. Limitations imposed by some devices such as mechanical hard drives, required only a portion of the interface data transfer rates to speeds to about 150 MB/s. SATA Revision 2.0 (SATA 3 Gb/s) provides 3 Gb/s signaling rate and effective doubling of data throughput to 300 MB/s. SATA Revision 3.0, refers to SATA 6 GB/s, allowing for increased interface transfer speeds. Although mechanical drives may hardly utilize full throughput of SATA Revision 3.0, solid state disk drives may benefit from the increased read speeds.

SATA interfaces may be preferred over conventional interfaces, as these interfaces provide greater speed, allow for upgradeable storage devices, simplify device configuration and maintenance, and significantly reduce the space needed for cables. Currently SATA hosts support hot plugging, that is adding SATA devices which interact with a computer and/or operating system, while the computer is operating. SATA hosts may also allow for hot swapping which relates to replacing SATA devices without shutting down the system. As provided in the SATA standard, SATA devices support hot plug. Thus, SATA host devices are aware when a new devices is connected.

Notably absent however, from the SATA standard and conventional methods and devices that utilize the SATA standard, is any provision for hot unplugging of a SATA device. As a result, a SATA host will not recognize disconnection of a SATA device. SATA host systems will typically provide an indication that the SATA device is still available until a user or application tries to access the non-existent device. At which point, the system will try several attempts at accessing the device before declaring device failure. Because existing software applications and SATA host interfaces in general do not address hot unplug, host systems are unaware when SATA devices are disconnected. Thus, operating errors may be generated.

Conventional solutions to SATA device disconnection rely on device manufacturers to provide host systems with software to detect disconnection. However, this is a tough obstacle for device manufacturers to determine software for every type of operating system of which the devices may be used. Further, these software solutions may not detect hot unplug. Thus, there is a need in the art for systems and methods of which address hot unplugging of SATA devices.

Another solution proposed in the SATA standard relates to monitoring SATA device power lines. This solution relies on the ability of a SATA host to not only to provide power to SATA device, but also to monitor the SATA device. Both requirements appear to be a significant obstacle. Moreover, the majority of current SATA devices receive power externally, and completely independent from a SATA host holding system power supply. As a result monitoring power lines by a SATA host may be virtually impossible. Thus, there is a need in the art for systems and methods of which address hot unplugging of SATA devices using SATA communication lines only.

BRIEF SUMMARY OF THE INVENTION

Disclosed and claimed herein, are systems and methods for serial advanced technology attachment (SATA) hot unplug. In one embodiment, a method includes detecting a connection of a SATA storage device to a host interface and monitoring physical (PHY) layer signals of SATA communication terminals, by a controller of the host interface, based on phase locked loop (PLL) response of the PHY layer signals. The method further includes detecting disconnection of the SATA device based on the PLL response and outputting a notification, by the controller, when the PLL response indicates that the SATA device has been disconnected.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 depicts a graphical representation of a device configured to provide hot unplug of a SATA device according to one embodiment of the invention;

FIG. 2 depicts a graphical representation of system to provide hot unplug of an eSATA device according to one embodiment of the invention;

FIG. 3 depicts a simplified block diagram of an interface to provide hot unplug of a SATA device according to one or more embodiments of the invention;

FIG. 4 depicts a process for providing SATA hot unplug according to one embodiment of the invention;

FIG. 5 depicts a process for SATA hot unplug according to another embodiment of the invention; and FIG. 6 depicts a graphical representation of a SATA pinout according to one embodiment of the invention.

DETAILED DESCRIPTION OF THE EXEMPLARY EMBODIMENTS

One aspect of the present invention is to provide hot unplug of Serial ATA (serial advanced technology attachment) devices. As disclosed herein, a method and apparatus are provided for hot unplug of SATA communication cables. In one embodiment, a method for hot unplug of SATA comprises monitoring SATA physical (PHY) layer signals, by a controller of the interface. Specifically, PHY layer phase locked loop (PLL) status signals are monitored and used for detecting disconnection and/or unavailability of the SATA device. In such an embodiment, hot unplug may be provided by monitoring communication lines only of the SATA device. In this fashion, monitoring of the SATA connection may allow for recognition that a device is no longer accessible to provide a host device with an indication of why a device is not accessible or should not be accessed. The solution may be incorporated into a host interface.

In another embodiment, a host interface is provided which is configured to provide hot unplug of a SATA device. The host interface may include a controller to monitor communication signals. As such, hot unplug may be provided for storage-interface for connecting host bus adapters to mass storage devices such as hard disk drives and optical drives. It should also be appreciated that the invention may be applied to other types of SATA devices, including port multiplier and switching devices, and any SATA communication device in general. In one embodiment, monitoring communication lines of the SATA terminals may be independent of power terminals of the SATA storage device. In yet another embodiment, the host interface may support native command queuing.

DESCRIPTION OF THE EXEMPLARY EMBODIMENTS

Referring now to the figures, FIG. 1 depicts a graphical representation of a device configured for hot unplug of SATA devices as described herein. Host computer 100 is depicted according to one embodiment of the invention. Computer 100 may relate to a computer having one or more interfaces to communicate with SATA devices according to one or more embodiments of the invention. As shown in FIG. 1A, computer 100 includes removable drive bays 110a and 110b each configured to receive a SATA storage devices. SATA devices can be one or more of a hard disk drive, optical drive and storage device in general. SATA device 115 relates to a SATA hard disk drive.

According to one embodiment of the invention, computer 100 may include a host interface to allow for hot plug, hot swapping and hot unplug of one or more SATA devices in contrast to the conventional methods and devices that do not support hot unplug of SATA drives. The host interface may provide a storage-interface for connecting host bus adapters to mass storage devices such as hard disk drives and optical drives. In one embodiment, the host interface of computer 100 relates to an advanced host controller interface (AHCI) providing an application programming interface which defines the operation of SATA host bus adapters in a non implementation-specific manner. As will be discussed in more detail below with respect to FIG. 3, the host interface of computer 100 may provide a system memory structure for computer hardware vendors to exchange data between host system memory and attached storage-devices.

According to another embodiment of the invention, a host interface may be provided for hot unplug of external SATA (eSATA) devices. Referring now to FIG. 2, a graphical representation of a system employing eSATA hot unplug according to one embodiment of the invention. System 200 may be configured to provide data from inside a computer to an external drive, and respectively from the eSATA drive to a computer in a fast and reliable fashion while allowing for hot unplug. System 200 in FIG. 2 includes computer 205, which may relates to a portable computer. It should also be appreciated that hot unplug of eSATA device may be provided for desktop computers, servers, etc. According to one embodiment of the invention, computer 205 includes a SATA interface for coupling to one or more eSATA devices, such as eSATA device 210. eSATA device 210 may relate to one of a hard disk drive, optical drive, and storage device in general, wherein eSATA device 210 is configured to operate with an eSATA configuration. By way of example, eSATA device may be coupled to computer 205 via a SATA port 220 shown in window 215.

Communication cable 225 may relate to an eSATA communication cable and may be coupled to SATA port 220 via eSATA connector 230. In one embodiment, communication cable 225 provides serial communication with shielded cables. In certain embodiments, communication cable 225 may include conductors to provide power to eSATA device 210. Connector 230 may have a SATA pinout as will be described in more detail below with respect to FIG. 6. As will be discussed below, a host interface of computer 205 may be configured to detect hot plug and hot unplug of connector 230 according to one or more embodiments.

Referring now to FIG. 3, a simplified block diagram is depicted of a host interface of a computer (e.g., computer 100) to provide data relative to a computer bus and SATA drive. Host interface 300 may also be configured for hot plug and hot unplug of a SATA device according to one or more embodiments of the invention. In one embodiment, host interface 300 may be included within a computer bus interface. According to another embodiment, host interface 300 may relate to an AHCI configured to support SATA functions. For example, host interface 300 may be configured to provide hot unplug according to one embodiment of the invention.

Input 305 of host interface 300 relates to a part of a SATA connector interface configured to receive data from a SATA device (e.g., SATA device 115). According to one embodiment, input signals received from the SATA device by input 305 are provided to controller 310. Controller 310 may be configured to receive SATA signals, recover data, and send the data to output 315 for output on a bus of a host device (e.g., computer, server, etc.). According to one embodiment, controller 310 includes a physical layer module (PHY) 335 which may be configured to receive SATA signals from input 305.

According to another embodiment, input 305 and output 310 may be configured to support a plurality of SATA devices. In an exemplary embodiment, input 305 and output 310 may be configured to support four SATA drives. According to another embodiment, input 305, and output 310, and host controller 300 may be configured to support SATA and eSATA drives.

Controller 300 further includes memory 325 which may be configured to store operating instructions of controller 310. According to another embodiment, controller 310 may be configured to operate based on one or more instructions stored in memory 325, wherein memory 325 relates to one of ROM and RAM memory.

Controller 310 may be configured to detect hot plug, hot unplug and/or hot swapping of SATA devices. Controller 310 may be configured to monitor connection of a SATA device using one of phase locked loop (PLL) and delayed lock loop (DLL) functionality to detect disconnection of a device. As shown in FIG. 3, controller 310 includes PLL functionality 320. In addition to PLL functionality 320, or some instances DLL functionality, controller 310 employs an RX_JOCK signal to detect hot plug, hot unplug and/or hot swapping of SATA devices, the RX_LOCK signal being a PLL lock status indicator.

Controller 310 may additionally be configured for native command queuing according to another embodiment. Similarly, controller 310 may be configured to support SATA 1.5 Gb/sec, SATA 3 Gb/sec and SATA 6 Gb/sec. According to another embodiment, interface 300 may be configured to provide an interface for up to four SATA devices. In that fashion, interface 300 provides users a cost-effective solution for upgrading an existing desktop and/or server systems with the advantage of transferring large quantities of data rapidly. In certain embodiments, host interface 300 may be integrated with bus components of a host device. Alternatively, host interface 300 may be a standalone unit.

According to another embodiment of the invention, controller 310 may employ low pass filtering for the PHY signal to avoid false triggering. In certain instances, signals received by controller 310 and processed by PLL functionality 320 may indicate PLL unlock for short periods of time due to communication disturbances. Accordingly, host interface 300 may include optional low pass filter (LPF) 330 configured to filter high frequency spikes which may trigger PLL unlock signal. Controller 310 may further be configured to provide functions for one or more of SATA logical, SATA PHY functionality 335 (physical connection), and SATA glue logic.

Although host interface 300 has been described above with reference to a SATA interface for a computer, it should equally be appreciated that host interface 300 may relate to an eSATA interface. Further, although described as units of hardware in FIG. 3, it should be appreciated that the functions of the units may be implemented in a variety of ways including hardware, firmware, software, and combinations thereof.

FIG. 4 depicts a process for providing SATA hot unplug according to one embodiment of the invention. Process 400 may provide SATA hot unplug of a SATA device. Process 400 may be initiated by detecting connection of a SATA drive at block 405. Process 400 may be performed by a host interface (e.g., host interface 300). At block 410, the host interface can monitor SATA physical (PHY) layer signals. A controller of the interface may determine if PLL becomes unlocked for a predetermined period of time by monitoring the PHY layer signal.

In one embodiment, the lock state of received PLL 320 and the RX lock signal are of particular interest to the controller. For example, the host controller may determine if prepared patterns of the PHY signals are below a threshold or unlocked for a predetermined period of time. Monitoring of communication lines may be independent of power signals of the SATA device. The controller may employ low pass filtering for the RX_LOCK PLL signal to avoid false triggering.

At block 415, the host interface can detect disconnection of the SATA device based on signals from the PLL of the PHY, such as disconnection of SATA device, or disconnection of a cable to an eSATA device. According to the SATA standard, the SATA host and SATA device are constantly communicating by a special set of bit-patterns (e.g., primitives). The primitives are constantly running between a SATA host and SATA device to maintain transfer clock synchronization of the (transfer) clock between both. The primitives may be embedded within synchronization clock signal based on 8b/10b encoding. According to one embodiment of the invention, detecting the presence of synchronization clock signal may provide a clear indication of the presence of transmitter, such as a SATA device. PHY level signals may be employed by SATA host, according to one embodiment, for recovering clock signal synchronization, synchronizing a receive clock and/or locking on to the clock. Thus, according to one embodiment, as soon as received PLL is locked, the SATA device is present. By way of example, if an RX_LOCK signal of the PHY is true, the SATA device is present. When a SATA device is not present, the RX_LOCK signal of the PHY will be false. Process 400 may include low pass filtering for the RX_LOCK PHY signal to avoid false triggering. By monitoring the PHY signals of a SATA device, disconnection and/or powering down of the SATA device may be detected. In that fashion, hot unplug may be provided according to one embodiment. Similarly, process 400 may be employed to detect a SATA device which is still coupled to the host device but not accessible due to power down of the SATA device. Further, monitoring communication lines of the SATA terminals may be independent of power terminals of the SATA storage device.

Process 400 may then proceed by outputting a notification, by the controller, indicating the SATA device has been disconnected at block 420. For example, the controller may output a signal to a communication bus of the computer to notify the host computer that an external device is no longer connected. Similarly, signals may be output to configure the host device to recognize disconnection of the SATA device. In that fashion, the host computer can terminate attempts to receive or transmit data to the devices.

Referring now to FIG. 5, a process is depicted of interface functions according to one or more embodiments of the invention. According to one embodiment, a controller of the host interface may perform process 500 as part of a SATA host interface including functions for hot plug, hot unplug, and hot swapping. Process 500 may be initiated by monitoring one or more SATA ports at block 505. At decision block 510, process may determine if a device is detected. Device detection may be based on a SATA standard for hot plugging. When a device is not detected ("NO" path out of decision block 510), the host interface continues to monitor the SATA port at block 505. When a device is detected, ("YES" path out of decision block 510) the interface enables operation of the SATA device at block 515. For example, the interface may notify an operating system of the host computer of the drive.

Following detection of a device, process 500 may proceed by monitoring SATA lines at block 520 to determine if the device is disconnected at decision block 525. When each device remains connected ("NO" path out of decision block 525), the host interface continues to monitor the SATA port at block 520. When a disconnection of a device is detected ("YES" path out of decision block 525), the host interface may then determine if a hot swap has been performed. Following disconnection, the host interface may check for connection of a new SATA device in the particular port which a device was disconnected. Process 500 may proceed by monitoring SATA lines and determining if a device was replaced within a predetermined period of time at decision block 530. When a disconnection of a device is detected ("YES" path out of decision block 530), the host interface may provide a notification to a host device of a hot swap at block 535. When a new device is not connected, ("NO" path out of decision block 530), the host interface can provide a notification to a host device that the device has been removed at block 540.

FIG. 6 depicts a graphical representation of a SATA pinout according to one embodiment of the invention. SATA pinout 600 relates to an exemplary port of a host interface which may be monitored. As depicted in FIG. 6, SATA pin arrangement includes seven (7) pin arrangement of a SATA communication connection. According to one embodiment, pins 605 and pins 610, shown as "A" pins and "B" pins respectively, can relate to reception and/or transmission pins. The controller module may detect the PHY signals derived from pins 605 and 610 to detect disconnection of a SATA device. According to one embodiment, the prepare patterns monitored may be based on output of pins 605 and 610. It should also be appreciated that other pin arrangements and pin configurations may be employed by the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing serial advanced technology attachment (SATA) hot unplug, the method comprising the acts of:
   detecting a physical connection of a SATA storage device to a host interface;
   monitoring physical (PHY) layer signals of SATA communication lines between the host interface and the SATA storage device, by a controller of the host interface;
   monitoring a phase locked loop (PLL) lock state of the PHY layer signals;
   detecting physical disconnection of the SATA storage device based on the monitored PLL lock state of the PHY layer signals;
   outputting a notification, by the controller, when the monitored PLL lock state of the PHY layer signals indicates that the SATA storage device has been physically disconnected; and
   low pass filtering a PLL lock signal corresponding to the PLL lock state to avoid false notification that the SATA storage device has been physical disconnected.

2. The method of claim 1, wherein detecting a connection of a SATA device relates to coupling of one or more of a SATA storage device and eSATA storage device to a host computer.

3. The method of claim 1, wherein monitoring the PLL lock state of the PHY layer signals includes detecting unlock of a PLL response for a predetermined period of time.

4. The method of claim 1, wherein outputting a notification relates to output on a communication bus of a host device.

5. The method of claim 1, wherein monitoring PHY layer signals comprises detecting clock synchronization patterns embedded within the PHY layer signals.

6. The method of claim 1, wherein monitoring PHY layer signals comprises monitoring the SATA communication lines independent of power terminals of the SATA storage device.

7. A serial advanced technology attachment (SATA) interface configured to provide hot unplug of a SATA storage device, the interface comprising:
   an input interface configured to receive one or more SATA drives; and
   a controller coupled to the input interface, the controller configured to:
      detect a physical connection of the SATA storage device to a host interface;
      monitor physical (PHY) layer signals of SATA communication lines between the host interface and the SATA storage device;
      monitor a phase locked loop (PLL) lock state of the PHY layer signals;
      detect physical disconnection of the SATA storage device based on the monitored PLL lock state of the PHY layer signals;
      output a notification when the monitored PLL lock state of the PHY layer signals indicates that the SATA storage device has been physically disconnected; and
      low pass filtering a PLL lock signal corresponding to the PLL lock state to avoid false notification that the SATA storage device has been physical disconnected.

8. The interface of claim 7, wherein detection of a connection of a SATA device, by the controller, relates to coupling of one or more of a SATA storage device and eSATA storage device to a host computer.

9. The interface of claim 7, wherein monitoring the PLL lock state of the PHY layer signals includes detection, by the controller, of PLL response unlock for a predetermined period of time.

10. The interface of claim 7, wherein the controller is further configured output a notification that relates to output on a communication bus of a host device.

11. The interface of claim 7, wherein the controller is further configured to monitor PHY layer signals by detecting clock synchronization patterns embedded within the PHY layer signals.

12. The interface of claim 7, wherein the controller is further configured to monitor PHY layer signals by monitoring the SATA communication lines independent of power terminals of the SATA storage device.

13. A non-transitory computer program product comprising:
   a computer storage medium having computer executable program code tangibly embodied therein to provide a serial advanced technology attachment (SATA) interface configured to provide hot unplug of a SATA storage device, the computer storage medium having:
      computer executable program code to detect a physical connection of the SATA storage device to a host interface;
      computer executable program code to monitor physical (PHY) layer signals of SATA communication lines between the host interface and the SATA storage device;
      computer executable program code to monitor a phase locked loop (PLL) lock state of the PHY layer signals;
      computer executable program code to detect physical disconnection of the SATA storage device based on the monitored PLL lock state of the PHY layer signals; and
      computer executable program code to output a notification when the monitored PLL lock state of the PHY layer signals indicates that the SATA storage device has been physically disconnected,
      low pass filtering a PLL lock signal corresponding to the PLL lock state to avoid false notification that the SATA storage device has been physical disconnected.

14. The computer program product of claim 13, wherein detection of a connection of a SATA device, by the controller, relates to coupling of one or more of a SATA storage device and eSATA storage device to a host computer.

15. The computer program product of claim 13, wherein computer executable program code to monitor the PLL lock state of the PHY layer signals includes computer executable program code to detect unlock of a PLL response for a predetermined period of time.

16. The computer program product of claim 13, wherein the computer executable program code to output a notification provides output on a communication bus of a host device.

17. The computer program product of claim 13, further comprising computer executable program code to monitor PHY layer signals by detecting clock synchronization patterns embedded within the PHY layer signals.

18. The computer program product of claim 13, further comprising computer executable program code to monitor PHY layer signals by monitoring the SATA communication lines independent of power terminals of the SATA storage device.

\* \* \* \* \*

UNITED STATES PATENT AND TRADEMARK OFFICE
CERTIFICATE OF CORRECTION

PATENT NO. : 8,549,191 B2
APPLICATION NO. : 12/651924
DATED : October 1, 2013
INVENTOR(S) : Mogilnitsky et al.

Page 1 of 1

It is certified that error appears in the above-identified patent and that said Letters Patent is hereby corrected as shown below:

In the Specification:

In Column 4, Line 58, delete "RX_JOCK" and insert -- RX_LOCK --, therefor.

Signed and Sealed this
Third Day of December, 2013

Margaret A. Focarino
*Commissioner for Patents of the United States Patent and Trademark Office*